Sept. 20, 1932.   A. Y. DODGE   1,878,824
CLUTCH
Filed Nov. 30, 1928
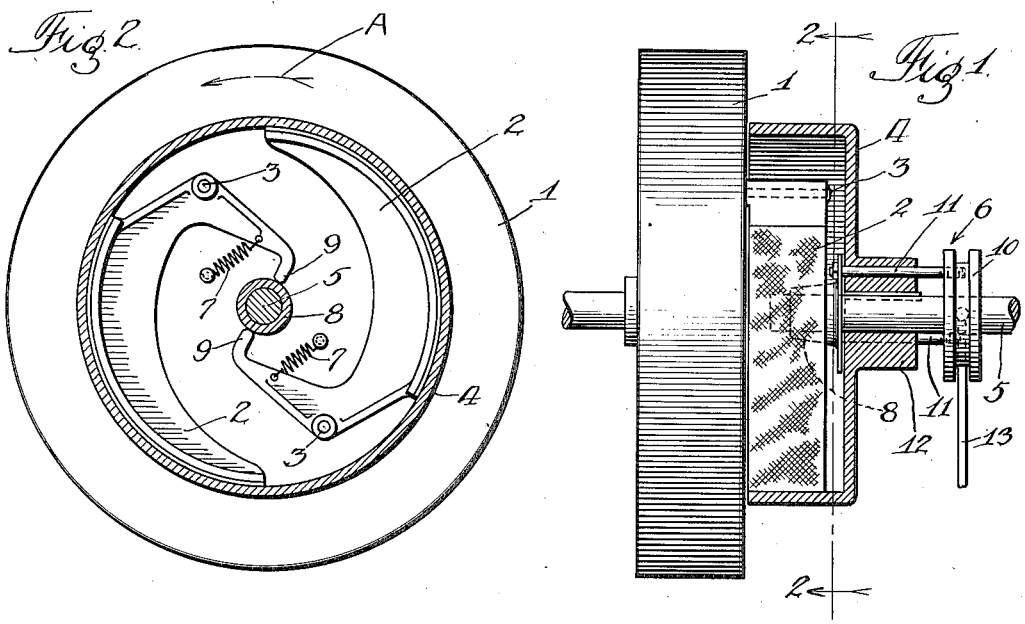
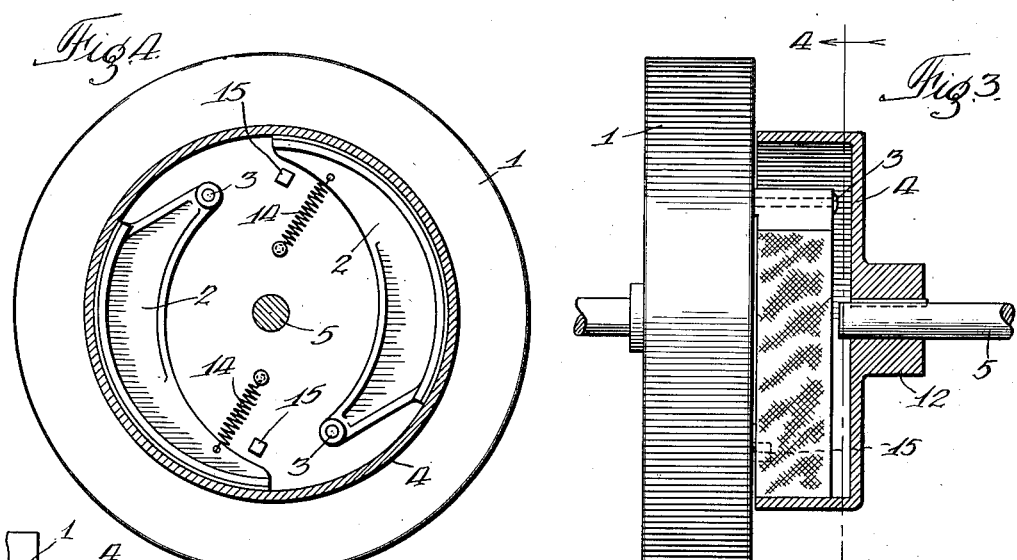
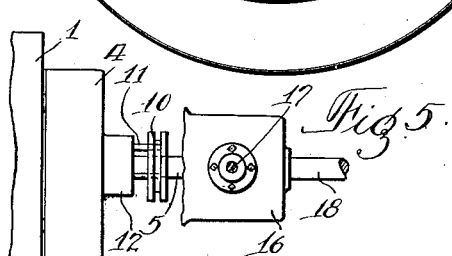

Patented Sept. 20, 1932

1,878,824

UNITED STATES PATENT OFFICE

ADIEL Y. DODGE, OF SOUTH BEND, INDIANA, ASSIGNOR TO BENDIX AVIATION CORPORATION, A CORPORATION OF DELAWARE

CLUTCH

Application filed November 30, 1928. Serial No. 322,728.

My invention relates to clutches.

One of the objects of my invention is to provide a clutch construction in which the connection between the driving member and driven member is controlled by centrifugal force.

A further object is to provide a construction in which the clutch may also be controlled by manually operable means. Such a construction may have special advantage in connection with an internal combustion engine in which it may be desirable that the clutch shall not become effective to transmit any substantial amount of energy until the engine has attained a reasonably high speed.

Further objects will appear from the description and claim.

In the drawing in which two forms of my invention are shown—

Figure 1 is an axial sectional view showing the clutch connection between the flywheel and transmission shaft;

Fig. 2 is a section on the line 2—2 of Fig. 1;

Fig. 3 is an axial sectional view showing another form;

Fig. 4 is a section on the line 4—4 of Fig. 3; and

Fig. 5 is a plan view showing the clutch in its relation to a selective variable speed transmission.

Referring to the drawing in detail, and first to Figs. 1 and 2, the construction shown therein comprises a flywheel 1 of an internal combustion engine, a pair of clutch shoes 2 pivotally mounted on the flywheel 1 at 3, a clutch drum 4 cooperating with the pivoted shoes 2, a transmission shaft 5 on which the clutch drum 4 is mounted and manually operable means 6 for throwing the clutch shoes 2 out of engagement with the clutch drum 4 when desired.

The weight of the clutch shoes 2 is so distributed that as the flywheel 1 rotates centrifugal force will cause the clutch shoes 2 to bear against the internal surface of the clutch drum 4 and in consequence thereof the clutching action increases as the speed of the flywheel 1 increases. Assuming that the flywheel rotates in the direction indicated by the arrow A, the clutch shoes will be self energizing, that is to say, the resistance offered to relative rotation between the flywheel 1 and the clutch drum 4 will be much greater in one direction of rotation than in the other. With this construction a comparatively slight outward pressure of the clutch shoes 2 will cause a relatively large driving force to be exerted on the clutch drum 4.

If desired, a pair of light springs 7 may be provided for holding the clutch shoes 2 in engagement with the clutch drum 4 when the flywheel 1 is rotating slowly to prevent the clutch shoes 2 from flopping around loosely.

The construction shown for manually throwing the clutch shoes 2 out of engagement with the clutch drum 4 comprises a cone 8 slidably mounted on the transmission shaft 5 and engageable with the inwardly extending fingers 9 of the clutch shoes 2 so that as the cone 8 is pushed to the left, as viewed in Fig. 1, the fingers 9 will be spread apart causing the clutch shoes 2 to disengage the clutch drum 4. The cone 8 may be operated by means of a flanged collar 10 connected with the slidable cone 8 by means of slidable pins 11 extending through openings in the hub 12 of the clutch drum 4. Any suitable shifting arm 13 may be provided for shifting the flanged collar 10 back and forth on the transmission shaft 5.

The construction shown in Figs. 3 and 4 may be substantially the same as that described in connection with Figs. 1 and 2, except that here the manually controlled clutch release is dispensed with and a pair of springs 14 are provided connected with the clutch shoes 2, the tendency of which is to resist the centrifugal action on the clutch shoes. Suitable stops 15 may be provided to limit the movement of the clutch shoes 2 when the flywheel 1 is rotating so slowly as not to overcome the action of the tension springs 14, thus preventing the clutch shoes 2 from having unnecessary movement as the speed of the engine changes.

It will be seen that I have thus provided a construction in which the clutch does not become effective, to transmit any substantial amount of energy, until the engine speed has become sufficiently great to permit efficient operation of the internal combustion engine.

In Fig. 5 the clutch is shown in connection with a selective variable speed transmission 16, which may be of any usual or suitable type, controlled by the gear shift lever 17, and enabling any one of several speed ratios to be maintained between the transmission shaft 5 and the propeller shaft 18.

This clutch is particularly adapted for use in automobiles to replace the present type clutch, and to be used with the transmissions now in prevalent use and more particularly to be used with the transmissions just coming into use, known as transmissions with "silent second" gear, or transmissions with two high gears. It will be seen that this clutch is particularly adaptable for the shifting of gears, inasmuch as immediately upon taking the foot from the accelerator it becomes easy to disengage the clutch. Much lighter springs are required than on present type clutches, thus making it particularly adaptable for large vehicles such as busses.

This design makes it feasible to use low friction materials for the friction surface, such as metal to metal. The ability to use low friction materials is obtained by the self-actuating or "servo" feature of the shoes, without resorting to large diameters or heavy weights. As shown in the drawing, this clutch is self-actuating in the direction of rotation of the motor. The self-actuating feature is sometimes spoken of as a "servo" feature, which merely means that the tangential force at the shoe face aids some other actuating means to create radial force.

I claim:

A centrifugal clutch comprising, in combination, a drum-shaped member rotatable both clockwise and counter-clockwise about a central axis, a carrier on a driving member likewise rotatable both clockwise and counterclockwise about said axis, a bell crank lever member pivoted on the carrier, said lever member provided with a friction face and urged outwardly toward said rotatable member by centrifugal force to frictionally engage said rotatable member, said lever being further provided with a radially extending projection at its end, which projection terminates adjacent said axis, and means movable along said axis and acting on said projection to force the shoe away from the rotatable drum member to release the clutch.

In witness whereof, I have hereunto subscribed my name.

ADIEL Y. DODGE.